(No Model.)

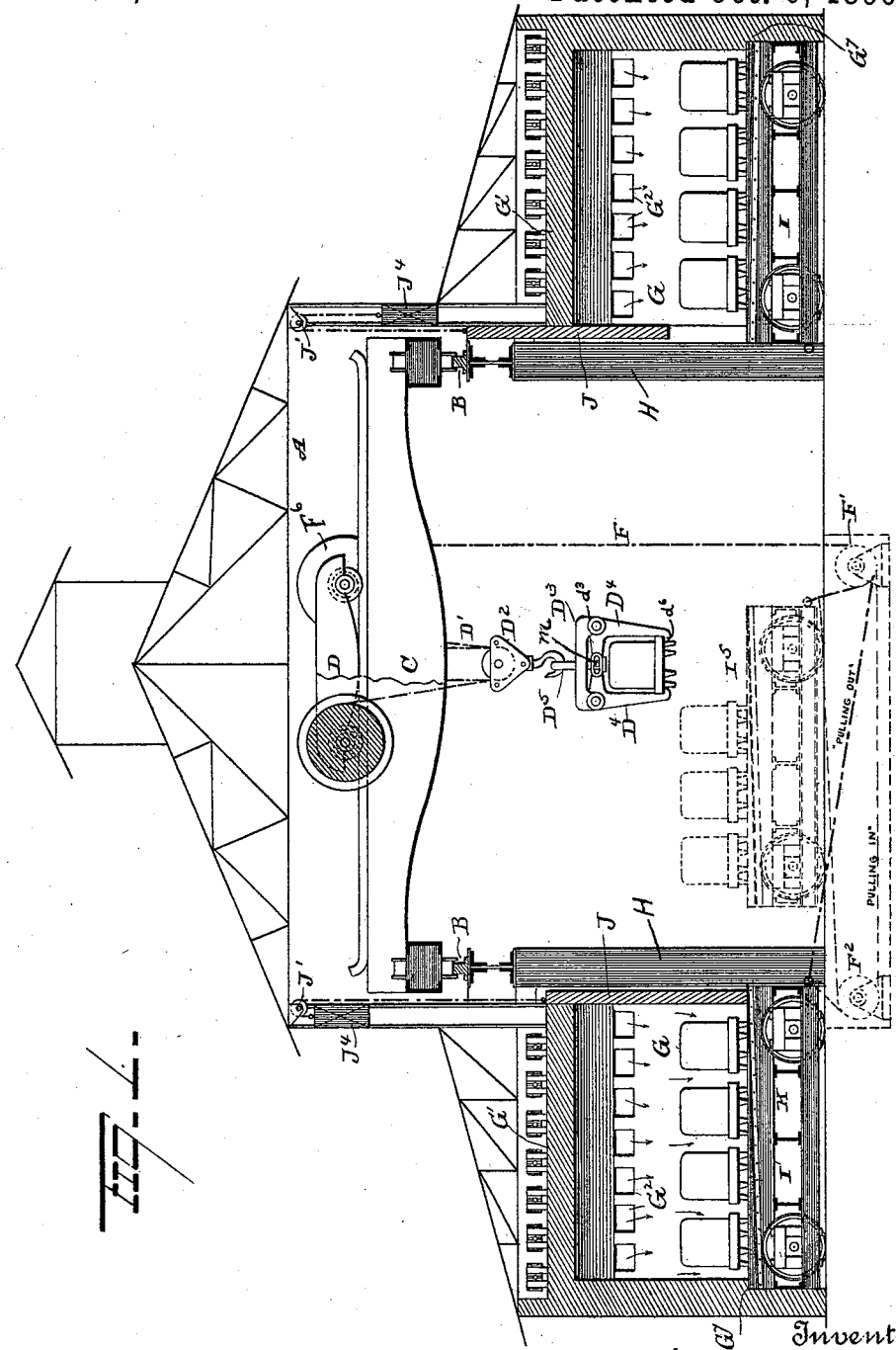

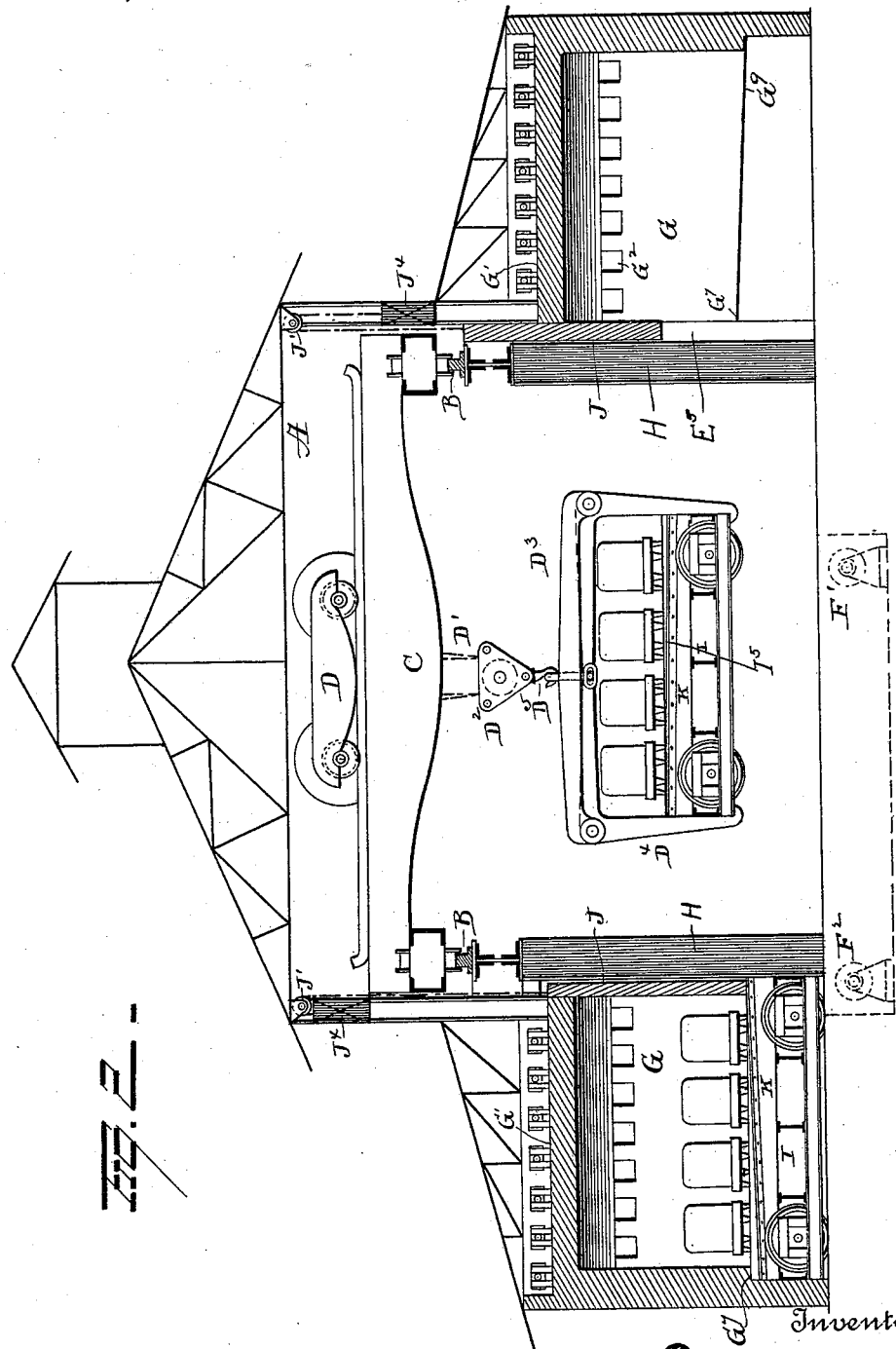

T. R. MORGAN, Jr.
PLANT FOR ANNEALING TIN PLATE.

No. 568,786. Patented Oct. 6, 1896.

Witnesses
E. J. Nottingham
G. F. Downing

Inventor
T. R. Morgan Jr.
By H. A. Seymour
Attorney

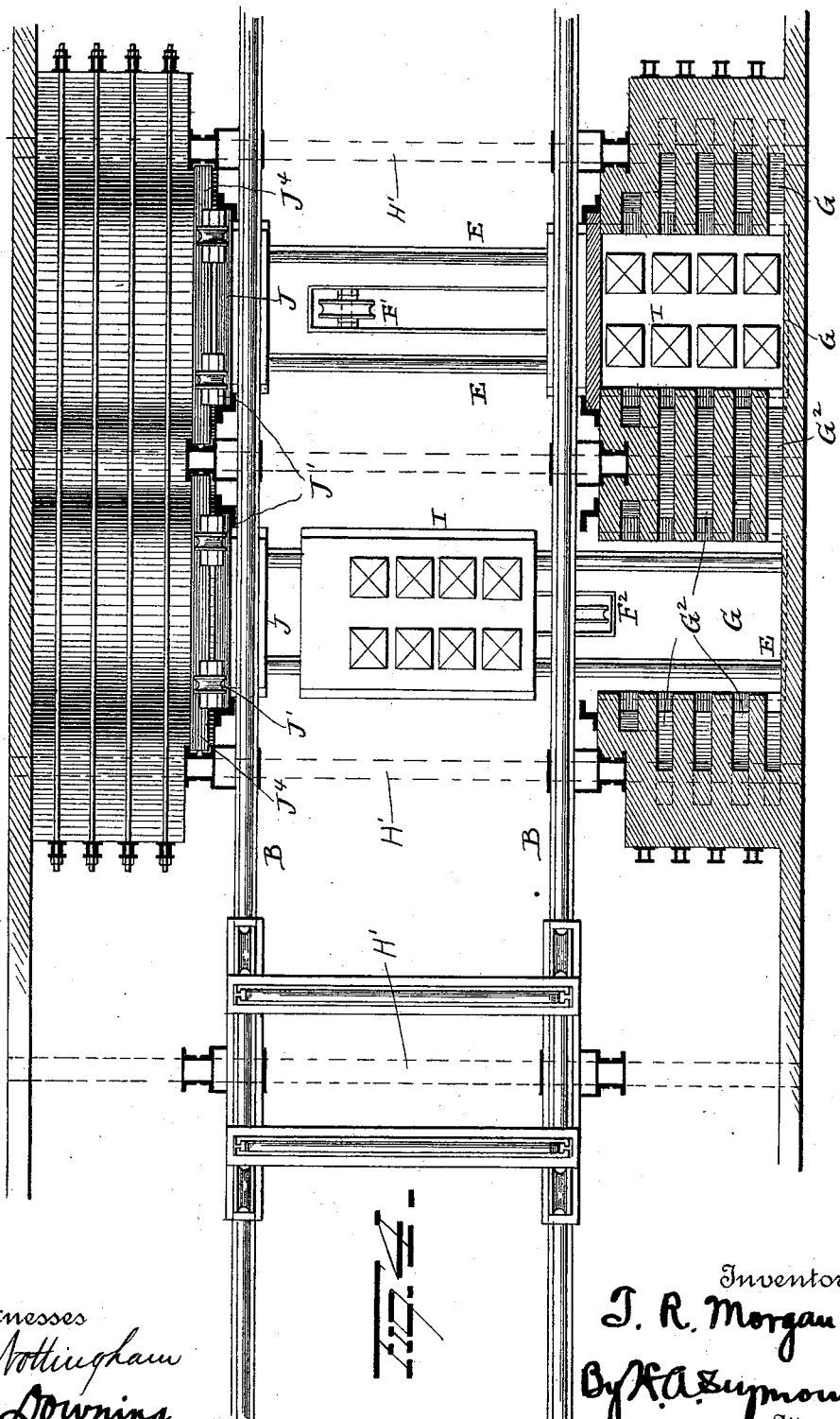

(No Model.) 5 Sheets—Sheet 5.

T. R. MORGAN, Jr.
PLANT FOR ANNEALING TIN PLATE.

No. 568,786. Patented Oct. 6, 1896.

UNITED STATES PATENT OFFICE.

THOMAS R. MORGAN, JR., OF ALLIANCE, OHIO, ASSIGNOR OF THREE-FOURTHS TO THOMAS R. MORGAN, SR., WILLIAM H. MORGAN, AND JOHN R. MORGAN, OF SAME PLACE.

PLANT FOR ANNEALING TIN-PLATE.

SPECIFICATION forming part of Letters Patent No. 568,786, dated October 6, 1896.

Application filed May 31, 1895. Serial No. 551,250. (No model.)

*To all whom it may concern:*

Be it known that I, THOMAS R. MORGAN, Jr., a resident of Alliance, in the county of Stark and State of Ohio, have invented certain new and useful Improvements in Plants for Annealing Tin-Plate; and I do hereby declare the following to be a full, clear, and exact description of the invention, such as will enable others skilled in the art to which it appertains to make and use the same.

My invention relates to an improvement in plants for annealing sheet-iron or tin-plate, the object of my invention being to provide apparatus whereby the sealed packs of tin-plate can be quickly charged and withdrawn from the ovens and to reduce to a minimum the wear and tear as now exists in the handling of this material.

A further object is to lessen to a considerable degree the enormous cost necessary under the processes and by the apparatus as now employed and at the same time increase the production and secure more uniformity in the quality of the finished product than can be accomplished by the present apparatus and methods.

In order to show the advantages of my apparatus and method over the apparatus and methods heretofore employed, it will be necessary to first describe, briefly, the methods and manipulations of the plates adopted in the most modern and lately-built plants.

Figure 5:
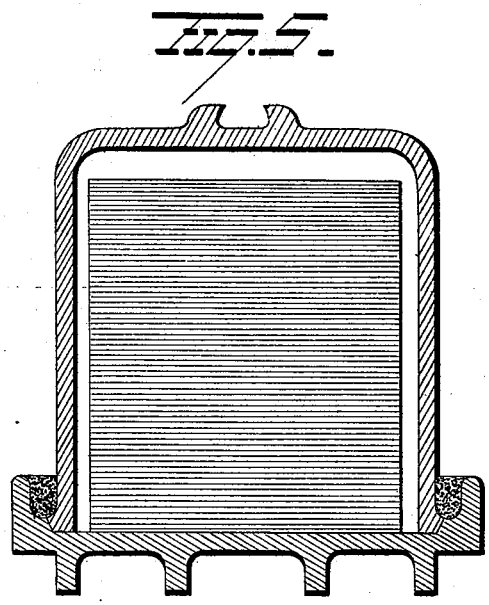
Figure 6:
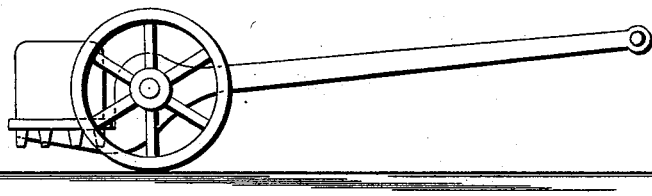

There are two main steps adopted—viz., the hot and cold rolling. The hot is generally called the "black process," and consists in rolling the hot plates from a thick slab or plate by repeated rolling until the plate is reduced to thickness of tin-plate. It is black or covered with a black oxid due to this first process, and is then sheared into proper size or squares and then pickled in an acid bath until it has been thoroughly cleansed of its oxid or impurities. It is then piled on cast-iron trays into a convenient pack, as shown in Fig. 5, and covered by cast-iron covers and sealed with sand filled around between cover and raised flange or tray to make an air-tight joint. These packs, as fast as piled, are conveyed to an ordinary oven or furnace (built in the same manner as bake-ovens or core-ovens) by a suitable truck made specially for the purpose only and as shown in Fig. 6. The weight of this receptacle containing pack of tin plates is about four thousand pounds, and the fulcrumed levered truck hereinafter referred to, with its manipulating-lever from fifteen to twenty feet long, is necessarily cumbersome and not easily operated.

When the truck is loaded, it requires about a dozen laborers to weigh down the long end of the lever to elevate the pack and to push or convey it to an annealing-oven, and the distance traveled is usually from one to two hundred feet.

In approaching the annealing oven or furnace the door is open and the laborers are exposed to an unbearable heat, which almost blinds them, and the pack is conveyed with a destructive rush to back end of oven-wall or against another pack, frequently overturning packs from trucks onto oven-floor and scattering the contents, thus causing loss and serious delays. This method of manipulation is repeated in the same manner until each furnace is charged to maximum capacity and the furnace or oven door sealed until all packs are carefully baked by intense heat, after which they are allowed to cool gradually. The packs are then taken out in the same manner by a group of men or laborers with fulcrumed levered trucks and conveyed into another department called the "cold-rolling" department. Each annealed plate is then drawn through rolls cold until it has been reduced to a standard gage or thickness. By this second step, called "cold-rolling," each plate has its material body so thoroughly and absolutely compressed that all impurities have been disposed and its entire nature made pure iron or steel, and its appearance is almost a white metal, resembling nickel. It is again piled up in the same manner as in the first process for annealing, in the same cast-iron trays, with covers, &c., and conveyed in same manner to same or another group of annealing-ovens and thoroughly baked, &c. After this, the last process of annealing, it is conveyed to the tinning department and there assorted and disposed.

Having described the two processes of annealing and the necessary manipulation of each pack, it will be necessary to state the further evils existing through the slow expensive process of manipulation and overannealing of the first pack, which is from its position the last taken out by the present-described method. Experience has taught in the process of annealing tin-plate (or anything else to be annealed) that a certain degree of temperature and a certain period of time in baking constitute the important elements necessary to be attained in a pure metal to be of certain ductility for the purpose intended. Any overheating or baking and any irregularity in temperature tend to produce a non-homogeneous metal. Consequently each sheet of tin-plate not uniform in nature will not uniformly absorb the coating. These are facts as they now exist, and it is my purpose to construct an annealing plant that will obviate to a minimum these difficulties.

Figure 2:
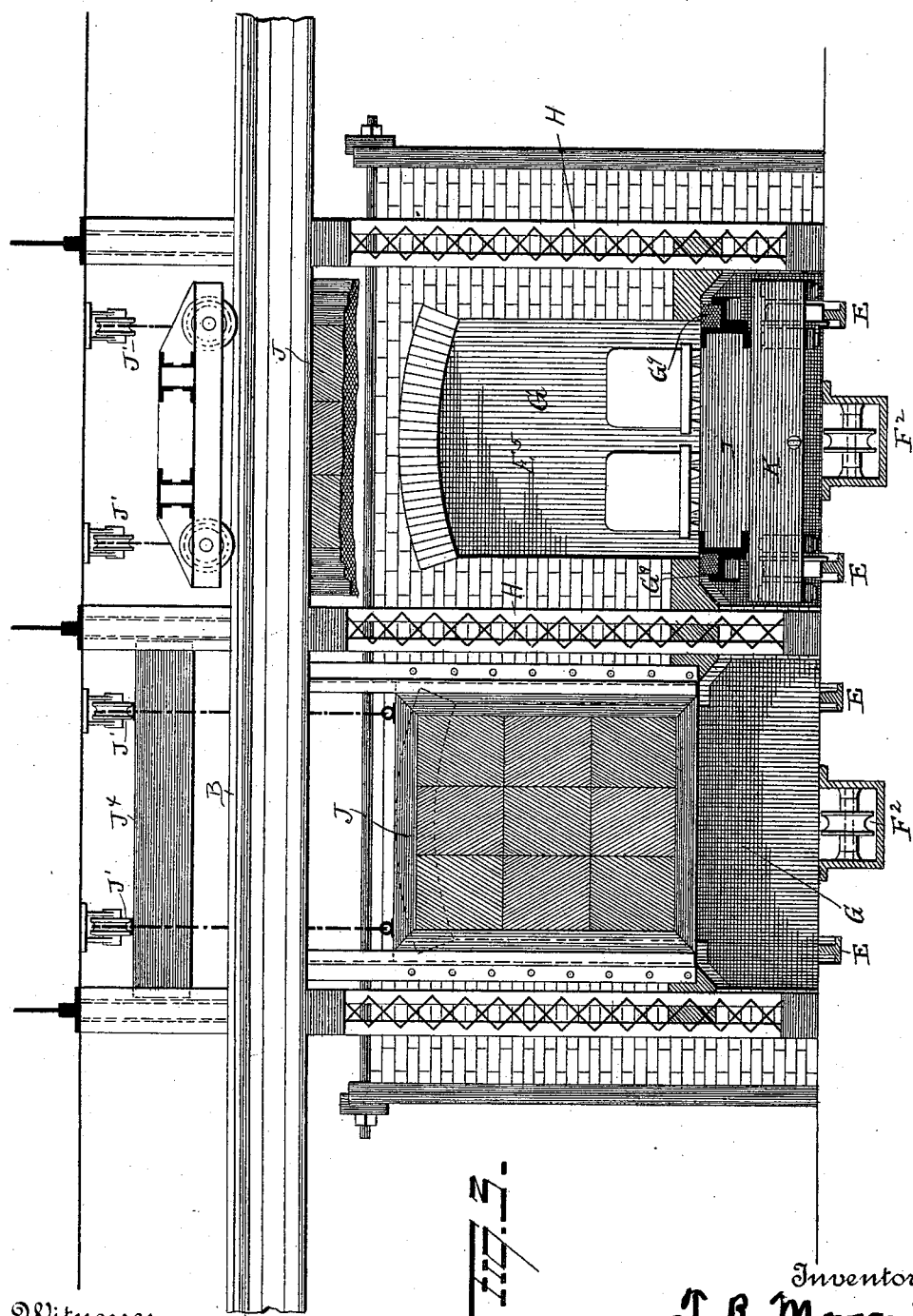

In the accompanying drawings, Figure 1 is a view in section of a plant, showing two ovens in longitudinal section. Fig. 2 is a similar view showing grappling-tongs constructed to elevate a car. Fig. 3 is a view in longitudinal section through the plant, showing the fronts of two ovens, one being closed and the other open. Fig. 4 is a view in plan showing the ovens at one side of the building in section. Fig. 5 is a view in section of casing and tray, and Fig. 6 is a view of the truck heretofore used for handling the trays.

My plant, which is designed to overcome the difficulties above recited and to expedite the manipulation and increase the production, consists of a building having a width of at least three times the length of one annealing-oven, so that two oven-cars could be drawn out into the main building and still leave room for passage-way between the ends of the oven-cars and elevated-crane columns.

Located lengthwise the main building A is an elevated railway B, on which the overhead traveling crane C travels. This crane carries one or more trolleys D of sufficient capacity to readily lift one entire oven-car loaded with packs of tin-plate (shown in Fig. 5) and convey same the entire length of the building and deposit it on any of the floor-tracks E leading to an annealing-oven. The power to be applied to this overhead traveling crane for driving would be preferably electric, of the Morgan Engineering Company type, with reduced complication and high speed.

The trolley D is provided with a lifting-chain D', carrying a block $D^2$, to which is attached automatic grappling-tongs, which in Fig. 1 are designed for lifting a single tray, such as shown in Fig. 5. These tongs consist of a frame $D^3$, provided with downwardly-projecting ends $d^3$, to which are pivoted the bell-crank arms $D^4$, which latter are provided at their lower ends with inwardly-projecting lugs or projections $d^6$, adapted to take under the side edges of the tray. The horizontal arms of the bell-cranks are preferably slotted and overlap, and are locked together and caused to move in unison by the pin $m$, carried by the eyebolt $D^5$, the pin passing through the slots in both bell-cranks. The bolt $D^5$ passes up through frame $D^3$ and is attached to the hook of block $D^2$. Thus it will be seen that when the grappling-tongs are suspended the lower ends of the arms $D^4$ are forced together and caused to grasp a tray, and when lowered, so that the weight of the tray is removed from the tongs, the arms can be readily opened to release the tray.

In Fig. 2 the tongs are constructed to engage the ends of the oven-car and lift the latter with the trays thereon and transport it from one point to another throughout the building.

If desired, I can provide the bridge C with a drum and motor for actuating the auxiliary hoist-chain F, which latter can be employed for lifting objects, but is designed primarily for moving the oven-cars in and out of the ovens. I prefer, however, to provide the trolley or trolleys with a drum $F^6$ for the chain F, and with either construction this chain would pass under a sheave F', located below the floor-level. To remove a car from an oven, the chain would be attached to the outer or adjacent end of the car, and hence by winding up on the chain the car would be withdrawn. For pulling a car into an oven the chain would be passed under sheave F', under and around sheave $F^2$, to the front end of car, and as sheave $F^2$ is located in line with the oven-doors it follows that by winding up on chain F the car can be moved to its position inside the oven.

The annealing-ovens G are built in the side wings or annexes of main building. Each oven has an arched roof G', with flues $G^2$ to admit ignited gas or flame for baking or annealing covered trays of tin-plate. To convey the heat to these annealing-ovens, the usual method is by vertical and horizontal flues underground, reaching to a furnace with a built-up fire or a pipe-main conveying natural or artificial gas.

As stated, I would prefer building these annealing-ovens in the side wings or annexes of main building and provide that each oven be built between columns H, supporting crane-elevated track and roof-chords H', as shown in general plan, Fig. 4. By so doing I am enabled to build a wide furnace with a complete open front, as shown at $E^5$, to admit a wide car containing eight covered trays of tin-plate for immediate charging and withdrawing. In annealing-ovens G (shown in Fig. 1) are the hearth-cars I. These portable hearth-cars are considerably longer than annealing-oven proper, so that the inner ends when in the ovens rest under ledge or end wall at $G^7$ and also form rests for balanced guillotine-door J when the latter is in closed position. In Fig. 2 it will be noticed that an inclined ledge $G^9$ is provided in each side wall or ovens to correspond with inclines $I^5$ on cars I. The box-body K of cars I is a metal body built up of channels or I-beams and inlaid with fire-brick or tile level with top of cars, on which the covered trays of tin-plate rest. The tile covering prevents destruction of car through distortion due to heat. The cars are thus protected by admitting a free circulation of cold air below, protecting all metal parts and machined surfaces. This balanced guillotine-door J is built of metal framing, having its interior surface composed of specially-prepared flat tile to resist heat and prevent distortion of door. To balance this door, two chains are coupled to top end, as shown, and pass over pulley-sheaves J', journaled in suitable brackets secured to longitudinal brace-beams resting on roof posts or columns. These chains are then coupled to a counterweight $J^4$ to slide between flanges of roof-columns for guides, and as shown more plainly in general plan, Fig. 4.

I have only shown two annealing-ovens in each side wing of building. This is sufficient to illustrate my improvements. The arrangement can be extended the entire length of the building on one or both sides, as judgment may dictate.

From the foregoing it will be seen that by employing a crane carrying automatic grappling-tongs a single tray can be lifted, conveyed from any part of the works to the oven or hearth-car, and deposited thereon, or a loaded car can be lifted and carried to the track E. The chain F is then attached and the car run into its position within the oven, forming the hearth thereof, after which the door is lowered and sealed, as previously described. The bottom of the car is open and exposed to the outer air, and hence is not injuriously heated. By this arrangement an entire set of trays are simultaneously deposited in the oven and removed therefrom, and hence are uniformly treated.

I do not claim as broadly new a furnace or oven having a portable hearth mounted on wheels, as such an arrangement has been previously used for other purposes, such as decarbonizing and recarbonizing molten metals and for heating ingots and armor-plates.

Having fully described my invention, what I claim as new, and desire to secure by Letters Patent, is—

1. In an annealing plant comprising an oven, a track leading into the oven, a portable hearth on the track, an overhead traveling crane and chain actuated by a drum on the crane and passing around sheaves in the floor for drawing the hearth into and removing it from the oven.

2. An annealing plant, comprising an oven, a track leading into the oven, a portable hearth on the track, an overhead traveling crane for depositing the filled trays on the hearth, a winding-drum and chain carried by the crane, and sheaves located below the floor of the building and around which said chain passes for moving the hearth in or out of the oven, substantially as set forth.

In testimony whereof I have signed this specification in the presence of two subscribing witnesses.

THOMAS R. MORGAN, JR.

Witnesses:
T. D. RUSSELL,
A. F. MORRIS.